United States Patent [19]

Kümmel et al.

[11] 4,098,324
[45] Jul. 4, 1978

[54] WATER-COOLED, HIGH-TEMPERATURE GASIFIER AND METHOD FOR ITS OPERATION

[75] Inventors: Joachim Kümmel, Kaarst; Heinz Dressen, Willich; Wilhelm Danguillier; Paul Gernhardt, both of Bochum; Wolfgang Grams, Herne; Siegfried Pohl, Bochum, all of Fed. Rep. of Germany

[73] Assignees: Dr. C. Otto & Comp. G.m.b.H., Bochum; Saarbergwerke A.G., Saarbrucken, both of Fed. Rep. of Germany

[21] Appl. No.: 746,400

[22] Filed: Dec. 1, 1976

[30] Foreign Application Priority Data

May 12, 1975 [DE] Fed. Rep. of Germany ....... 2554666

[51] Int. Cl.$^2$ .................................................. F22B 1/00
[52] U.S. Cl. ..................................... 165/1; 165/107 D; 48/67; 122/5; 122/6 A; 122/7 R
[58] Field of Search ..................... 48/67; 165/107 D, 1; 122/5, 7 R, 7 A

[56] References Cited

U.S. PATENT DOCUMENTS

| | | | |
|---|---|---|---|
| 1,897,950 | 2/1933 | Battin et al. | 48/67 |
| 2,179,638 | 11/1939 | Koppers | 48/67 |
| 2,603,559 | 7/1952 | Patterson | 48/67 X |
| 3,059,913 | 10/1962 | Sands | 165/107 D X |

*Primary Examiner*—Albert W. Davis, Jr.
*Attorney, Agent, or Firm*—Thomas H. Murray

[57] ABSTRACT

A system for cooling high-temperature gasifiers and method for its operation wherein cooling conduits extend vertically through the walls of the gasifier and are connected at their ends to a closed-water circulation system which incorporates heat exchangers for removing heat from the system. Boiling in the system is prevented, and good heat transfer characteristics are achieved, by maintaining a high pressure system, at least 40 bar, coupled with a flow velocity of between 5 and 7 meters per second at a maximum internal diameter of the cooling conduits of 51 millimeters. Means are provided for maintaining the temperature of the water exiting from the cooling conduits at least 10° C below the boiling point at the pressure and flow rate of the system.

The cooling tubes in the walls of the gasifier are covered by a ramming compound of refractory material held in place by expanded metal or mesh which curves around each tube but is spaced therefrom and welded to webs interconnecting the tubes in a gas-tight wall. The expanded metal supports the ramming compound but at the same time does not come into direct contact with the tube walls and thus eliminates points of maximum thermal loading where boiling might occur.

5 Claims, 3 Drawing Figures

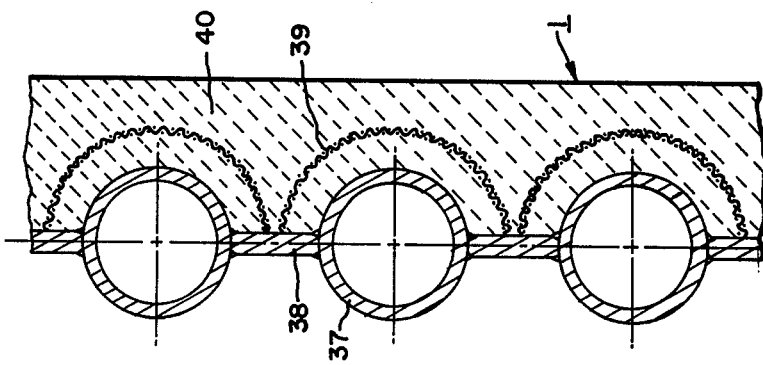
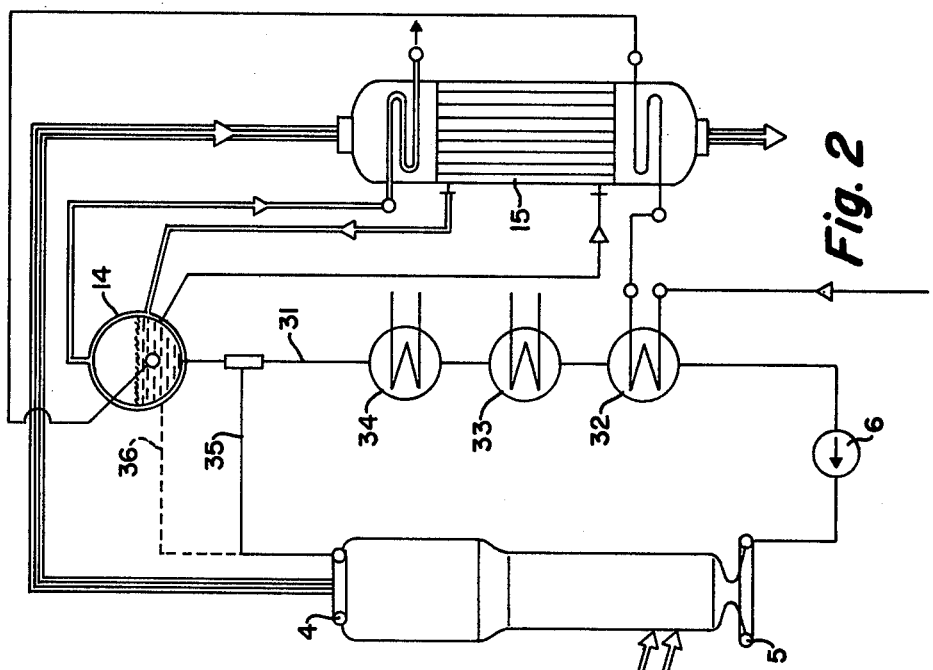
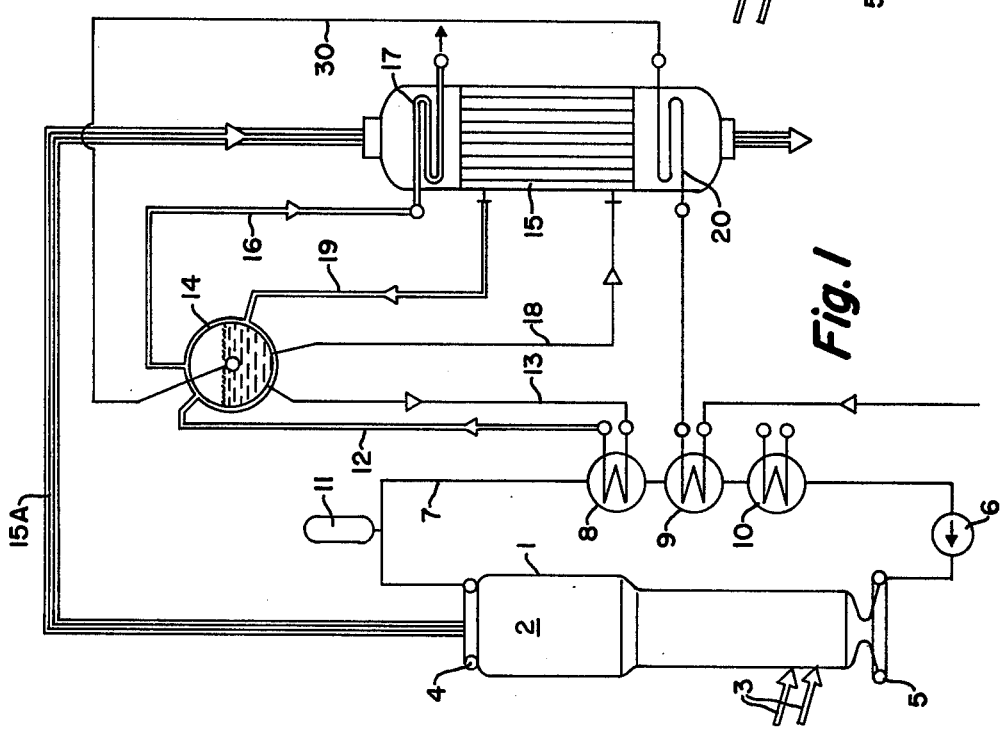

WATER-COOLED, HIGH-TEMPERATURE GASIFIER AND METHOD FOR ITS OPERATION

BACKGROUND OF THE INVENTION

The present invention relates to a cooling system for a high-temperature gasifier such as the slag bath generator shown in copending application Ser. No. 642,899, filed Dec. 22, 1975 and assigned to the assignee of the present application. In such a gasifier, coal or other fossil fuel feedstocks are gasified by the introduction of oxygen and water vapor. The composition of the raw gas emanating from the gasifier depends on that of the fuel feedstock, the operating conditions of the selected process and the gasification media employed for the supply of oxygen (e.g., air). The raw gas contains varying proportions of carbon monoxide, hydrogen, methane, carbon dioxide and non-dissociated water vapor and proportions of nitrogen which vary in accordance with the gasification medium. Sulfur, normally contained in the fuel feedstock, occurs in the gas mainly in the form of hydrogen sulfide as well as in the form of organic sulfur compounds. Satisfactory gasification of the fuel feedstock is frequently possible only if its admixtures are also gasified or are made to enter a specific chemical reaction. Some fuel feedstocks must, therefore, be gasified in high-temperature gasifiers. That is, they must be gasified at a high operating temperature. The high operating temperature may also be necessary to discharge liquid slag and to obtain thermal breakdown of heavy hydrocarbons.

A high-temperature gasifier can reach operating temperatures of between 1500° and 2200° C. Slag bath generators are particularly suitable as high-temperature gasifiers and are characterized by a simple mode of slag discharge. That is, the slag collects at the generator bottom in the molten state and then discharges through an overflow weir. The fluid level in the generator can be established as desired by means of the overflow weir.

Certain of the older gasifiers are operated at atmospheric pressure or with a slight positive pressure of about 0.2 bar. More recent generators, on the other hand, utilize a pressure of 20 bar or more in the gasification chamber. The output for a given gasifier surface cross section is multiplied by the pressure so that only such so-called high-pressure gasifiers are being used if large outputs are required.

Particularly intensive cooling is necessary to meet the high gasifier temperature and high gas pressure. The gasifier is, therefore, provided with walls having tubes extending therethrough and through which cooling water flows in a closed circuit. These tubes are covered with a coating of refractory ramming compound so that they are not directly exposed to the high operating temperatures. Since the tubes are smooth, the ramming compound will not readily adhere to the tubes. In prior art gasifiers, pins are welded to the tubes, for example in two rows on each tube, extending in the longitudinal direction thereof, so that oppositely-disposed rows of pins of two adjacent tubes are inclined at an angle toward each other. This provides sufficient retention for the ramming compound on the tubes, at least when the gasifier is started up.

During the starting-up procedure, the ramming compound surface nearest the interior of the gasifier reaches a temperature of between 600° and 800° C, depending upon the thickness of the ramming compound. The melting point of the slag is above this temperature, usually between 900° and 1500° C. The slag deposited on the ramming compound, therefore, solidifies and reinforces the thermal insulation so that no further slag solidifies after a specific slag coating thickness has been reached. Any slag which is then precipitated within the gasifier remains liquid and flows into the slag bath at the bottom of the generator where it flows out through the aforesaid weir.

The slag continues to adhere to the interior of the gasifier wall for as long as the latter is operated at a uniform operating temperature. If the temperature is reduced (i.e., when the gasifier is shut down), there is a risk that the slag coating will become partially detached due to contractions. The tubes of the cooling system will, therefore, be exposed at these places either because the slag coating adheres too strongly to the ramming compound or the ramming compound itself has been reduced due to slag diffusion through the slag coating.

Freely-exposed cooling tubes in a gasifier of this type give rise to extreme operating risks. Normally, under the protection of the ramming compound and/or the solidified coating, the cooling tubes are exposed to a heat flux density of 50,000 to 100,000 kcal/hm$^2$, but the heat flux density without the protection is approximately 1,000,000 kcal/hm$^2$. Such a high thermal loading very readily causes film boiling which occurs particularly in the region of the pins at the inner walls of the cooling tubes. An integral vapor film will, therefore, be formed on the internal wall of the cooling tube adjacent the pins. This vapor film has a thermal insulating effect and prevents adequate cooling of the cooling tube wall. If a cooling tube is destroyed by the high thermal loading due to insufficient cooling, and if cooling water is discharged into the gasification chamber, this will result in uncontrolled generation of steam and an increase of pressure on the gas side with well-known consequences. Special safety precautions must, therefore, be provided in high-temperature gasifiers, and this includes a maximum degree of cooling.

A distinction is made in cooling between pure water cooling which can be described as a single-phase flow and boiling cooling, referred to as a two-phase flow (i.e., water and steam). Plain water cooling is obtained with a simple water flow without the formation of any vapor. This form is employed in older slag bath generators operated at atmospheric pressure and with a cooling water flow rate of 0.5 to 2.5 meters per second. Cooling water under slight water pressure up to about 4 atmospheres absolute reaches a temperature of approximately 135° C.

Boiling cooling, in contrast to pure water cooling, is characterized by much higher thermal transfer coefficients and is used in high pressure gasifiers in view of the aforementioned physical conditions and the resulting need for safety. However, this does not preclude film boiling in the cooling tubes. The risk of boiling is merely reduced by the higher thermal transfer coefficients. If vapor bubbles form on the inside of the cooling wall tube in point contact therewith to a greater or lesser extent, such steam bubbles will become detached from the water flow, which is turbulent more particularly due to boiling, and form a second flow phase in addition to the water. These conditions may alter if the cooling tube wall is overheated because of the risk of an integral film being formed again. Despite the fact that the risk of film boiling is merely reduced, this process is almost exclusively employed in the more recent high-pressure gasifiers.

In cases in which boiling cooling is not employed, the cooling walls are protected against overheating by brickwork of approximately 450 to 500 millimeters thickness. These generators can be used at operating temperatures of up to 1600° C only and, despite the thick brickwork, provide adequate protection for cooling walls for only a relatively short period. The reason for this is the action of the slag and the high temperature of the brickwork. As in the case of the ramming compound, the brickwork is reduced by the slag; and this action is substantially accelerated at operating temperatures above 1600° C and causes destruction of the brickwork in a short time.

SUMMARY OF THE INVENTION

In accordance with the present invention, a new and improved system is provided for cooling high-temperature gasifiers, the system being a single-phase water-cooling system which eliminates or materially reduces the risk of film boiling. This is achieved by special water cooling with conditional single-phase flow. High thermal transfer coefficients are achieved by a cooling water velocity of between 5 and 7 meters per second in the cooling pipes which have a maximum internal diameter of 51 millimeters, together with high mass flow rates $C_o$ (kg/cm$^2$h) associated with the cooling water velocity. This means that the thermal transfer coefficients obtained by cooling exclusively with water are low compared with boiling cooling and are compensated by a greater mass flow. Safety requirements which demand that film boiling is prevented under all circumstances are obtained by a cooling water temperature which is at least 10° C and preferably 25° to 100° C below the boiling temperature of the cooling water at the relevant pressure in the cooling system.

If the initially-described heat flow density of the cooling system increases from about 50,000 to 100,000 kcal/hm$^2$ to the extreme value of approximately 1,000,000 kcal/hm$^2$ due to detachment of the ramming compound or of the insulating slag coating, the boiling film being formed is already broken up into steam bubbles and dispersed because of the high velocity of the cooling water flow. Although the cooling water velocity according to the invention is less than the exit velocity of the cooling water in known boiling cooling, the absence of the vapor component causes the cooling water to have an effect on a forming boiling film which is entirely different from the effect of the cooling water flow of boiling cooling.

As in boiling cooling, the steam bubbles will detach from the interior wall of the cooling tube but with the difference that they condense in the core flow of the cooling water (i.e., they collapse into themselves and are not maintained as a second phase). This phenomenon is accompanied by intense high-frequency pulsation similar to the cavitation effects which occur in pumps, which substantially increase the thermal coefficients and thus counteract any further film boiling. If boiling films were required to be broken up in boiling cooling by increasing the cold-water velocity (i.e., by increasing the mass flow coefficients), the cold-water velocity would have to be increased from 1 to 2.5 meters per second in the normal case to a multiple thereof. The volumetric increase resulting from water evaporation would then yield exit velocities showing an increase of between 55 and 100 meters per second compared with the normal values of between 6 and 25 meters per second. Water-vapor mixtures flowing at these velocities cause erosion in manifolds and bypasses situated on the downstream side and lead to their eventual destruction. Velocities of this kind cannot be obtained in practice. Therefore, film boiling in a boiling cooling system cannot be eliminated by increasing the cold-water velocity.

According to another feature of the invention, the cooling water temperature at the generator inlet side is 200° to 210° C. It is, therefore, above the dewpoint of the raw gas. The cooling water at the generator exit has a temperature of 210° to 235° C for a heat increase of between 10° and 25° C. The minimum cooling water pressure is 40 bar. Compared with conventional cooling water pressures, this represents a substantial increase and, apart from eliminating boiling films as explained above, results in a minimum volumetric increase accompanied by local vapor formation and does not lead to instability in the cooling system. Furthermore, the cooling water pressure of at least 40 bar permits a substantial reduction in the heating surface areas of heat exchangers which abstract from the cooling water the heat taken up by it in the generator. The efficiency of the plant is thus improved; and the high-temperature level of the cooling water also contributes to higher efficiency.

The temperature difference from the boiling line is approximately 25° C with cooling water at a pressure of 40 bar; and the difference is approximately 40° to 80° C at the preferred pressure of between 50 and 100 bar.

The cooling system of the generator according to the invention is incorporated into a waste-heat boiler if such a waste-heat boiler follows the generator for cooling the raw gas obtained to a specified temperature for further processing or to utilize the thermal energy contained in the raw gas. This procedure offers various advantages. The feed water and circulating water of the waste-heat boiler abstracts a large portion of the heat taken up by the generator cooling water. Compared with steam rising in known generators, this produces steam at a high temperature and higher pressure, offering far better utilization for the same amount of heat than steam at a lower temperature and lower pressure. The efficiency of the waste-heat boiler or of the system is thus improved.

The waste-heat boiler system can be incorporated into the invention by connecting the exit side of the generator cooling system to the waste-heat boiler drum of the waste-heat boiler. If the water temperature in the exhaust steam drum is higher than the generator cooling water temperature, it is advantageous if the generator cooling system duct which discharges the water is directly connected to the suction duct associated with the exhaust steam drum, namely, below the exhaust steam drum. If the place at which the generator cooling water enters the suction line is situated at a suitable distance from the exhaust steam drum, the generator cooling water cannot absorb heat from the exhaust steam drum.

Incorporation of the invention into a waste-heat boiler system can also be achieved by means of a so-called double-pressure system, namely, by the generator cooling system forming the primary circuit of the double-pressure system.

In addition to incorporation into a waste-heat boiler system, further cooling of the generator cooling water is provided by heat exchangers on the downstream side which supply heat abstracted from the cooling water for various purposes, more particularly for feed-water preheating and for steam generation.

According to another feature of the invention, tube walls, welded in a gas-tight manner, are provided in the gasifier. Tube walls of this kind enable the retaining means for the ramming compound to be attached so that the retaining means are at most in indirect contact with the cooling tubes. This can be achieved, for example, by mounting the retaining means for the ramming compound on the webs which interconnect the cooling tubes into gas-tight walls. Advantageously, this eliminates places of maximum thermal loading which are the result of pins provided on prior art gasifiers for retaining the ramming compound.

The same effect can be achieved by ramming compound retaining means according to the invention which becomes detached from the pipe walls together with detachment of the ramming compound and/or the slag therefrom. This is the case with a light-weight wire mesh, hexagon grid or expanded metal which is mounted by spot-welds to the webs of the tube walls.

The tube walls can also be provided with a coating applied by plasma or flame-spraying which has a substantial surface texture to which the slag adheres well. The ceramic coating provides the cooling tubes with the necessary insulation during the start-up phase until a slag skin has formed on the tubes to perform this function. The material for the ceramic coating is advantageously $Al_2O_3$. Cooling tubes have a radiation coefficient $C = 3.3$ to $4$ kcal/m$^2$h (degree)$^4$, but the radiation coefficient of a ceramic coating of $Al_2O_3$ is 0.94 to 1.39 kcal/m$^2$h (degrees)$^4$. The ceramic coating, therefore, absorbs only a third of the heat radiation which is absorbed by the cooling tubes. The remainder is reflected. This is advantageous even before the protective slag coating is produced on the tube walls and even thereafter when the slag has become glazed (i.e., transparent), and does not filter part of the heat radiation.

The ceramic coating obviates the need for the ramming compound and its retention in the region above the place at which the fuel feedstock is fed into the system. A coating thickness between 0.2 to 3 millimeters is usually sufficient.

The above and other objects and features of the invention will become apparent from the following detailed description taken in connection with the accompanying drawings which form a part of this specification, and in which:

FIG. 1 is a schematic illustration of one slag bath generator cooling system of the invention;

FIG. 2 is a schematic illustration of a modified slag bath generator cooling system according to the invention; and FIG. 3 illustrates part of the tube wall of a slag bath generator constructed in accordance with the invention, utilizing wire mesh to hold a ramming compound in place.

With reference now to the drawings, and particularly to FIG. 1, the cooling walls of a slag bath generator are designated generally by the reference numeral 1. The cooling walls surround the gasification chamber 2 of the gasifier which is supplied with coal duct, oxygen and water vapor as indicated generally by the arrows, reference numeral 3. The particular fuel which is being gasified is immaterial. The kind of material gasified only affects the quantity of the gasification medium which is produced. The slag bath and the flame jet of the generator which is directed to the bath enable any desired temperature up to 2500° C to be obtained.

The cooling walls 1 comprise a plurality of vertical or horizontal cooling tubes which impart the longitudinal sectional shape shown diagrammatically in FIG. 1 to the space surrounded by the cooling walls 1, the cooling tubes merging at the top end into a ring main 4 and at the bottom end to a ring main 5. The cross section of the tube wall is shown in FIG. 3 and will hereinafter be explained in detail. A circulating pump 6 pumps sufficient cooling water into the bottom ring main 5 to insure that cooling water at a temperature of 200° C flows from the main ring 5 at a velocity of 5 to 7 meters per second through the cooling tubes, which have a maximum internal diameter of 51 millimeters, into the top ring main 4. Assuming an operating temperature of 1700° to 2500° C in the gasifier, the cooling water is heated through 25° C while passing through the tubes with a cooling water pressure of 40 bar. The cooling water pressure and the velocity prevent boiling of the cooling water as explained above.

The heated cooling water from the top ring main 4 is supplied through a circulating line 7 to several heat exchangers 8, 9 and 10 which are connected in series. After leaving the last heat exchanger 10, the cooling water is again returned to the cooling tubes at a temperature of 200° C. A compensating vessel 11 which is a pressure accumulator, is connected to the circulating line 7 between the top ring main 4 and the first heat exchanger 8. The compensating vessel 11 equalizes the change of volume of water when this is heated.

The cooling tubes with the ring mains 4 and 5, the circulating line 7, the heat exchangers 8, 9 and 10 and the circulating pump 6 form a closed-cooling water circuit which comprises the primary circuit of a two-pressure system shown in FIG. 1. In the heat exchanger 8, the cooling water circuit is connected to a second circuit which comprises the secondary circuit of the two-pressure system. The secondary circuit includes a riser 12 and a downcomer 13. The riser 12 and the downcomer 13 connect the heating surfaces of the heat exchanger 8 to an exhaust steam drum 14. The riser 12 extends into the drum interior above the water level of the exhaust steam drum and the downcomer 13 enters the interior of the drum below the water level. The heat exchanger, therefore, is supplied with water from the exhaust steam drum by natural circulation (i.e., because of differences in specific gravity). The water begins to boil in the heat exchanger 8 at a pressure in this case of 25 bar, to be returned as a water-steam mixture through the riser 12 into the exhaust steam drum 14.

The exhaust steam drum 14 is part of the waste-heat boiler 15 connected to the output of the gasifier 2. The steam collected in the exhaust steam drum is supplied through a duct 16 to a superheater 17 situated in the waste-heat boiler 15 and then escapes. The cooling water is also supplied through a downcomer 18 to a cooling system situated downsteam of the superheater 17 in the waste-heat boiler 15; and this cooling water flowing through the downcomer 18 is returned to the exhaust steam drum through a riser 19. The riser 19 and the downcomer 18 are both connected to the exhaust steam drum 14, the point of entry of the downcomer 18 being substantially lower than that of the riser 19.

The waste-heat boiler 15 is supplied with raw gas from the slag bath generator through conduit 15A after the gas has undergone intermediate cooling to a temperature about 850° to 900° C. The superheated steam discharged from the superheater 17 can be supplied for any desired purpose. The waste-heat boiler 15 is a medium pressure boiler given a steam drum pressure of 25 bar.

The heat exchanger 9 which follows the heat exchanger 8 on the cooling water system is intended for preheating the feed water for drum 14. It is connected in series with another feed-water preheater 20 in the waste-heat boiler, the feed water which is preheated in this manner being supplied to the exhaust steam drum through a duct 30. The heat exchanger 10 is optionally connected to a low-pressure boiler or comprises such a boiler. By controlling the cooling medium flowing through the heat exchanger 10, the temperature of the water entering the ring main 5 can be controlled to insure that the water, when it exits from the ring main 4, has a temperature below the boiling point of the water at the pressure utilized.

The slag bath generator cooling system shown in FIG. 2 differs from that of FIG. 1 in that the riser 12 and the downcomer 13 are replaced by a suction line 31 which is connected to the exhaust steam drum 14, the other connections being the same. The suction line 31 contains several serially connected heat exchangers 32, 33 and 34 of which the heat exchanger designated by the numeral 32 corresponds to the heat exchanger 9, the heat exchanger designated by the numeral 33 corresponds to the heat exchanger 10 and the heat exchanger 34 being any other heat exchanger. The heat exchangers 33 and 34 can be utilized to alter the temperature of the water entering the ring main 5 to insure that the boiling temperature is not reached at the pressure utilized. The suction line 31 is connected to the circulating pump 6 which pumps the cooling water into the bottom ring main 5 as in the embodiment illustrated in FIG. 1. The heated cooling water discharged from the top ring main 4 is again supplied directly to the suction line 31 through a duct 35, preferably at a position between 2 and 3 meters below the exhaust steam drum.

The cooling water discharged from the ring main 4 can also be supplied to the exhaust steam drum 14 directly through a duct 36 shown in broken lines. Connection of the generator cooling circuit on the water and pressure side to the exhaust steam drum in both cases insures that the generator cooling circuit and the waste-heat boiler are operated at the same pressure.

In FIG. 3, the individual cooling tubes 37 of the cooling walls 1 are shown in cross section. The cooling tubes 37 are welded into a gas-tight wall by means of webs 38. These webs 38 extend perpendicularly between the cooling tubes 37 and are welded thereto. They extend along the entire lengths of the tubes 37 so as to provide the aforesaid gas-tight wall. A grid of expanded metal or mesh 39 curves over each cooling tube 37 and is tacked by spot-welding to the middle of two adjacent webs 38. The expanded metal 39 functions as a retaining means for the ramming compound 40 which is applied to the cooling tubes 37 on the gas chamber side (i.e., the right side shown in FIG. 3). In this manner, the expanded metal or mesh 39 acts to secure the ramming compound 40 in place, but at the same time, it does not make direct contact to any of the cooling tubes 37 so as to form "hot spots" on the tube walls where vapor can form. This is in contrast to the prior art techniques described above wherein fingers or rods were welded at the individual tubes 37 to act as a supporting means for the ramming compound 40.

Although the invention has been shown in connection with certain specific embodiments, it will be readily apparent to those skilled in the art that various changes in form, arrangement of parts and method steps can be made to suit requirements without departing from the spirit and scope of the invention.

We claim as our invention:

1. A method for cooling the walls of a high-temperature gasifier, which comprises providing in said walls a plurality of tubular conduits interconnected at their opposite ends, causing cooling water to flow through said conduits in a closed-water circulation circuit, maintaining the flow velocity of the water through the conduits to between 5 and 7 meters per second at a pressure of at least 40 bar, and maintaining the exit temperature of the water from the conduits at least 10° C below its boiling temperature at the pressure of the cooling system.

2. The method of claim 1 wherein said conduits each have a maximum internal diameter of 51 millimeters.

3. The method of claim 1 wherein the temperature of the cooling water on entering said conduits is about 200° to 210° C.

4. A method for cooling the walls of a high-temperature gasifier, which comprises providing in said walls a plurality of tubular conduits interconnected at their opposite ends, causing cooling water to flow through said conduits in a closed-water circulation circuit, maintaining the exit temperature of the water from the conduits below its boiling temperature at the pressure of the cooling system, passing raw gas from said gasifier to a waste-heat boiler, and transferring heat from said closed-water circulation circuit to a second water-circulation circuit of lower pressure than the first-mentioned circuit, the second circuit causing water to flow through said waste-heat boiler.

5. The method of claim 4 characterized in that the second circuit includes an exhaust steam drum of the waste-heat boiler.

* * * * *

UNITED STATES PATENT OFFICE
CERTIFICATE OF CORRECTION

Patent No. 4,098,324　　　　　　　　Dated July 4, 1978

Inventor(s) Joachim Kummel, Heinz Dressen, Wilhelm Danguillier,
　　　　　　Paul Gernhardt, Wolfgang Grams and Siegfried Pohl It is certified that error appears in the above-identified patent and that said Letters Patent are hereby corrected as shown below:

In the Claim for Priority:

Change "May 12, 1975 [DE]　Fed.Rep. of Germany ...... 2554666"

to -- December 5, 1975 [DE]　Fed.Rep of Germany ...... 2554666--

Signed and Sealed this

Sixth Day of February 1979

[SEAL]

Attest:

RUTH C. MASON
Attesting Officer

DONALD W. BANNER
Commissioner of Patents and Trademarks